United States Patent
Suek et al.

(10) Patent No.: US 6,718,111 B1
(45) Date of Patent: Apr. 6, 2004

(54) FERRULE POLISHING FIXTURE

(75) Inventors: Paul Suek, Eden Prairie, MN (US); George Pfeffer, Puenta Gorda, FL (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/061,732

(22) Filed: Feb. 1, 2002

(51) Int. Cl.[7] .................................................. G02B 6/00
(52) U.S. Cl. ........................................ 385/137; 385/147
(58) Field of Search .................................. 385/137, 147, 385/85; 451/278

(56) References Cited

U.S. PATENT DOCUMENTS

| | | |
|---|---|---|
| 2,577,312 A | 12/1951 | Donahue |
| 3,868,794 A | 3/1975 | Zitkus |
| 4,291,502 A | 9/1981 | Grimsby et al. |
| 4,498,260 A | 2/1985 | Doty |
| 4,693,035 A | 9/1987 | Doyle |
| 4,709,512 A | 12/1987 | Okubo et al. |
| 4,802,680 A | 2/1989 | Fuchs |
| 4,819,386 A | 4/1989 | Struyf |
| 4,831,784 A | 5/1989 | Takahashi |
| 4,905,415 A | 3/1990 | Moulin |
| 5,107,627 A | 4/1992 | Mock, Jr. et al. |
| 5,281,884 A | 1/1994 | Basavanhally et al. |
| 5,321,917 A * | 6/1994 | Franklin et al. ............ 451/386 |
| 5,345,323 A | 9/1994 | Basavanhally et al. |
| 5,349,784 A | 9/1994 | Grois et al. |
| 5,447,464 A | 9/1995 | Franklin et al. |
| 5,577,149 A | 11/1996 | Averbeck et al. |
| 5,643,064 A | 7/1997 | Grinderslev et al. |
| 5,674,114 A * | 10/1997 | Miller et al. ................ 451/278 |
| 5,711,701 A | 1/1998 | Grinderslev et al. |
| 5,720,653 A * | 2/1998 | Miller et al. ................ 451/278 |
| 5,818,993 A * | 10/1998 | Chudoba et al. ............. 385/81 |
| 6,396,996 B1 | 5/2002 | Carpenter et al. |
| 2002/0131723 A1 * | 9/2002 | Kolasinski et al. ........... 385/85 |

FOREIGN PATENT DOCUMENTS

| | | |
|---|---|---|
| DE | 40 04 665 A1 | 8/1991 |
| EP | 0 579 056 A1 | 1/1994 |
| EP | 0 621 107 A1 | 10/1994 |
| JP | 59-161256 | 9/1984 |
| JP | 60-217055 | 10/1985 |
| JP | 61-113005 | 5/1986 |
| JP | 63-283854 | 5/1987 |
| JP | 63-316811 | 12/1988 |
| JP | 5-19140 | 1/1993 |
| JP | 5-157941 | 6/1993 |
| JP | 8-164942 | 6/1993 |
| JP | 6-138343 | 5/1994 |
| SU | 738825 | 6/1980 |

OTHER PUBLICATIONS

Amos, A.G., "Flexing Lathe Fixture Grips Tapered Washers", *American Machinist*, p. 166(May 9, 1955).

* cited by examiner

*Primary Examiner*—Chandrika Prasad
(74) *Attorney, Agent, or Firm*—Merchant & Gould P.C.

(57) ABSTRACT

The present disclosure relates to a device for holding a plurality of fiber optic connectors. The device includes a clamp defining a plurality of ferrule receiving openings, a set plate with openings for the fibers, an alignment surface on which the ferrules rest, and an actuator for moving moveable portions of the clamp. The clamp has a plurality of moveable portions that at least partially define the ferrule receiving openings. The moveable portions are moveable between a rest, biased closed position in which the ferrules are clamped within the ferrule receiving openings, and an open position in which ferrules can be inserted in the ferrule receiving openings.

12 Claims, 7 Drawing Sheets

FERRULE POLISHING FIXTURE

FIELD OF THE INVENTION

The present invention relates generally to the field of polishing fixtures for holding fiber optic cables during the polishing process.

BACKGROUND OF THE INVENTION

Fiber optic connectors generally include a cylindrical ferrule containing an optical fiber. A tip of the fiber is exposed at an end face of the ferrule. To enhance signal quality, it is desirable to polish the end face of ferrule. During the polishing process, the ferrule is commonly held in a fixture, and the end face is pressed against a rotating polishing wheel or disk. An example of a fixture for use in polishing fiber optic connectors is described in co-pending U.S. patent application Ser. No. 09/400,334, filed Sep. 21, 1999, which application is incorporated herein by reference.

SUMMARY OF THE INVENTION

One aspect of the present invention relates to a device for holding fiber optic connectors having ferrules containing optical fibers, the device including a clamp having a nest sized to hold a ferrule. The nest includes a moveable portion moveable between a first position where the nest is sized to receive the ferrule and a second position where the nest is sized to clamp the ferrule. The moveable portion is biased toward the second, clamped position.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrates several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

The present invention relates to a system for holding fiber optic connectors to facilitate polishing ferrules of the connectors. One representative embodiment of the invention includes a fixture 30 having a plurality of clamps for holding ferrules. The clamps are normally closed. The system also includes an actuation device 123 for opening the clamps to allow the ferrules to be inserted into or removed from the clamps.

In use of the system, the fixture 30 is mounted on the actuation device 123, and the actuation device 123 is used to simultaneously open the clamps. The ferrules of the connectors desired to be polished are then inserted into the clamps. After insertion of the ferrules, the actuation device 123 releases the clamps thereby allowing the clamps to return to their normally closed orientation. In the normally closed orientation, the clamps securely hold the ferrules within the fixture. Thereafter, the fixture can be removed from the actuating device and mounted on a polishing device (e.g., a polishing wheel including a polishing film mounted on a polishing pad, as is conventionally known in the art). After the ferrules have been polished, the fixture 30 is returned to the actuation device 123, and the clamps are opened to allow removal of the polished ferrules.

I. Fixture

Figure 1:
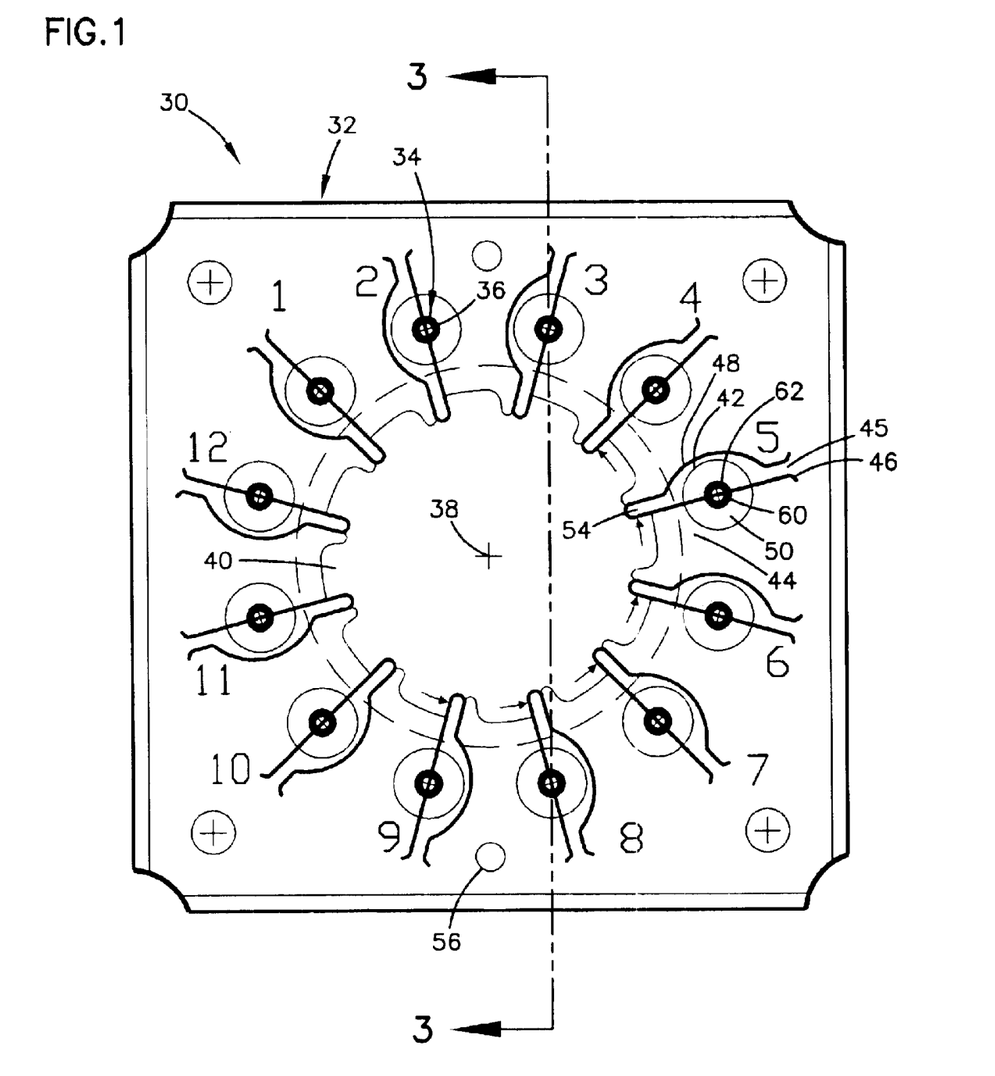
FIG. 1 is a top plan view of an embodiment of a fixture constructed in accordance with the principles of the present invention, the fixture is shown with nests of the fixture in the biased closed orientation.
Figure 2A:
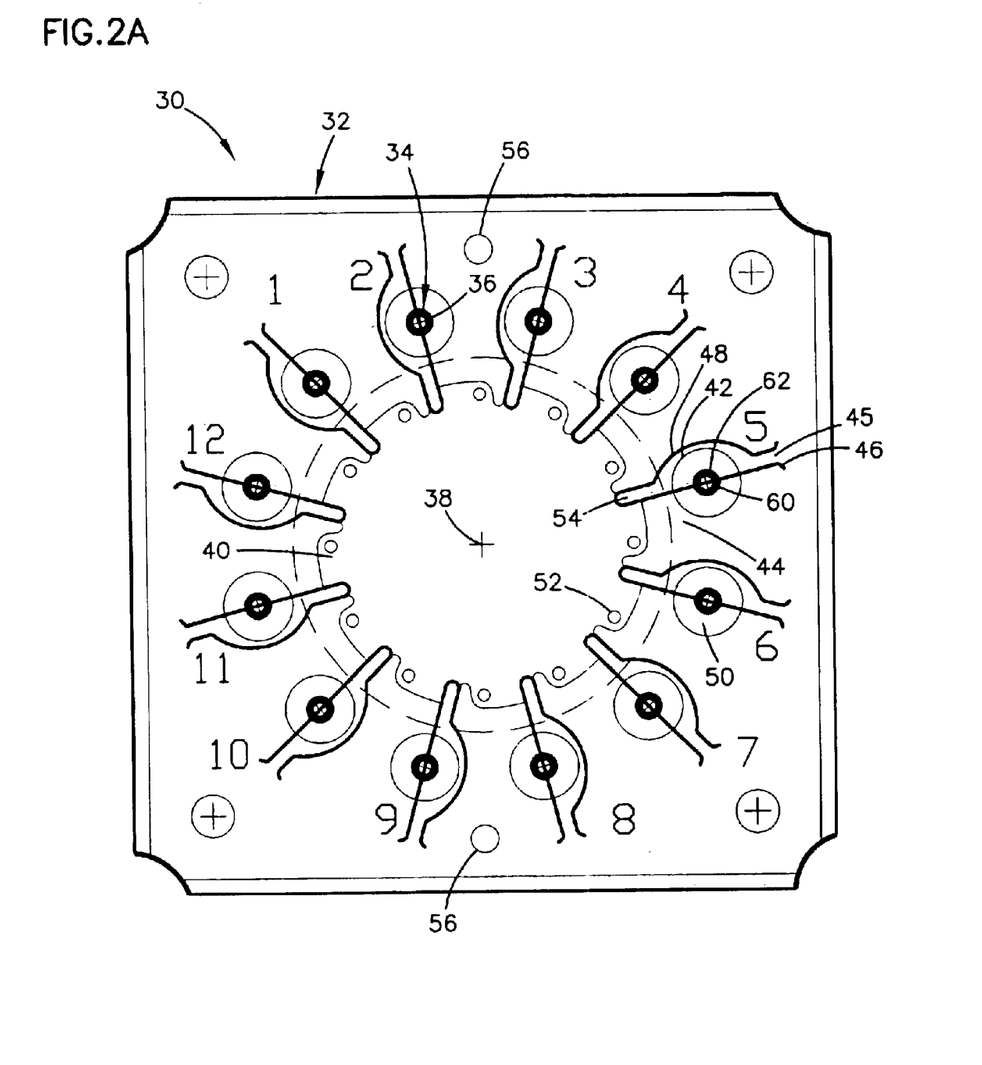
FIG. 2A is a top plan view of the fixture of FIG. 1 in place on an actuating device with the nests in the biased closed orientation.
Figure 2B:
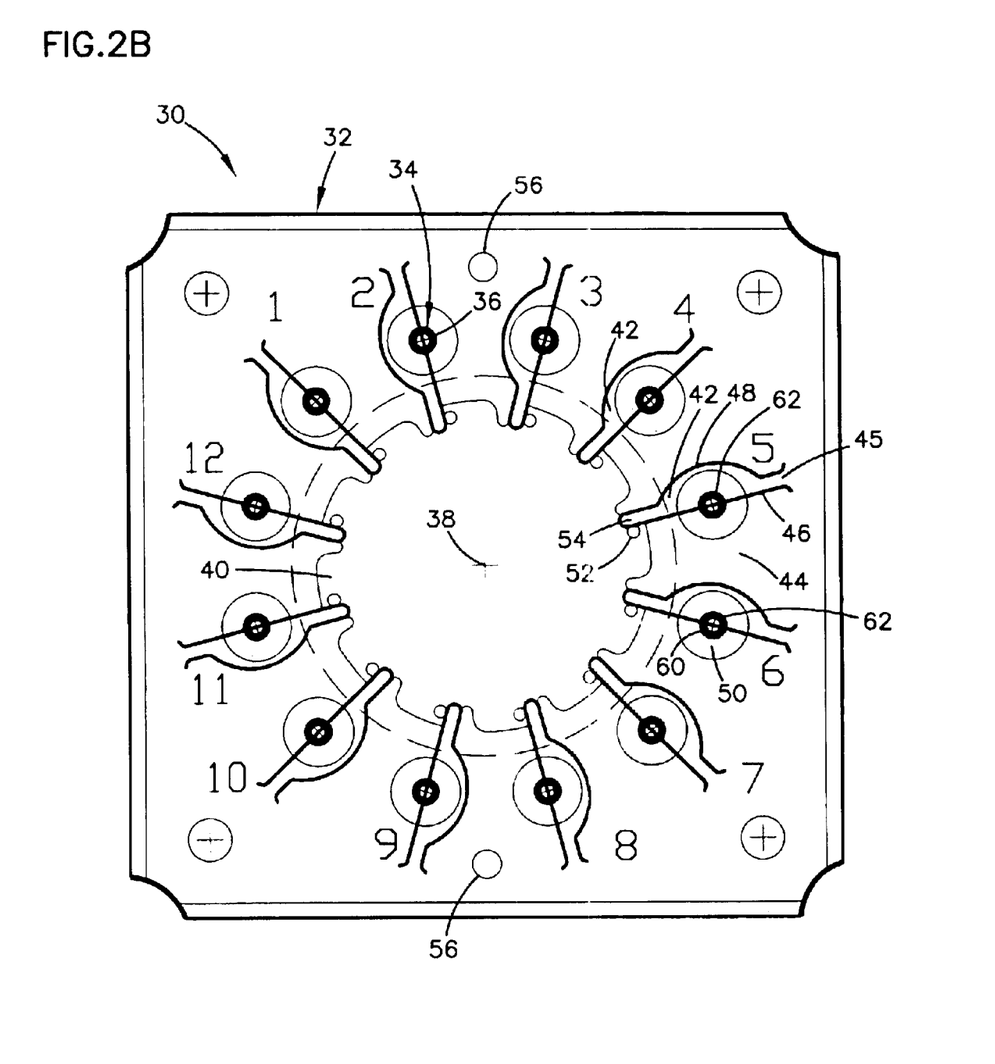
FIG. 2B is a top plan view of the fixture of FIG. 1 in place on an actuating device, with the nests in an open orientation.
Figure 3:
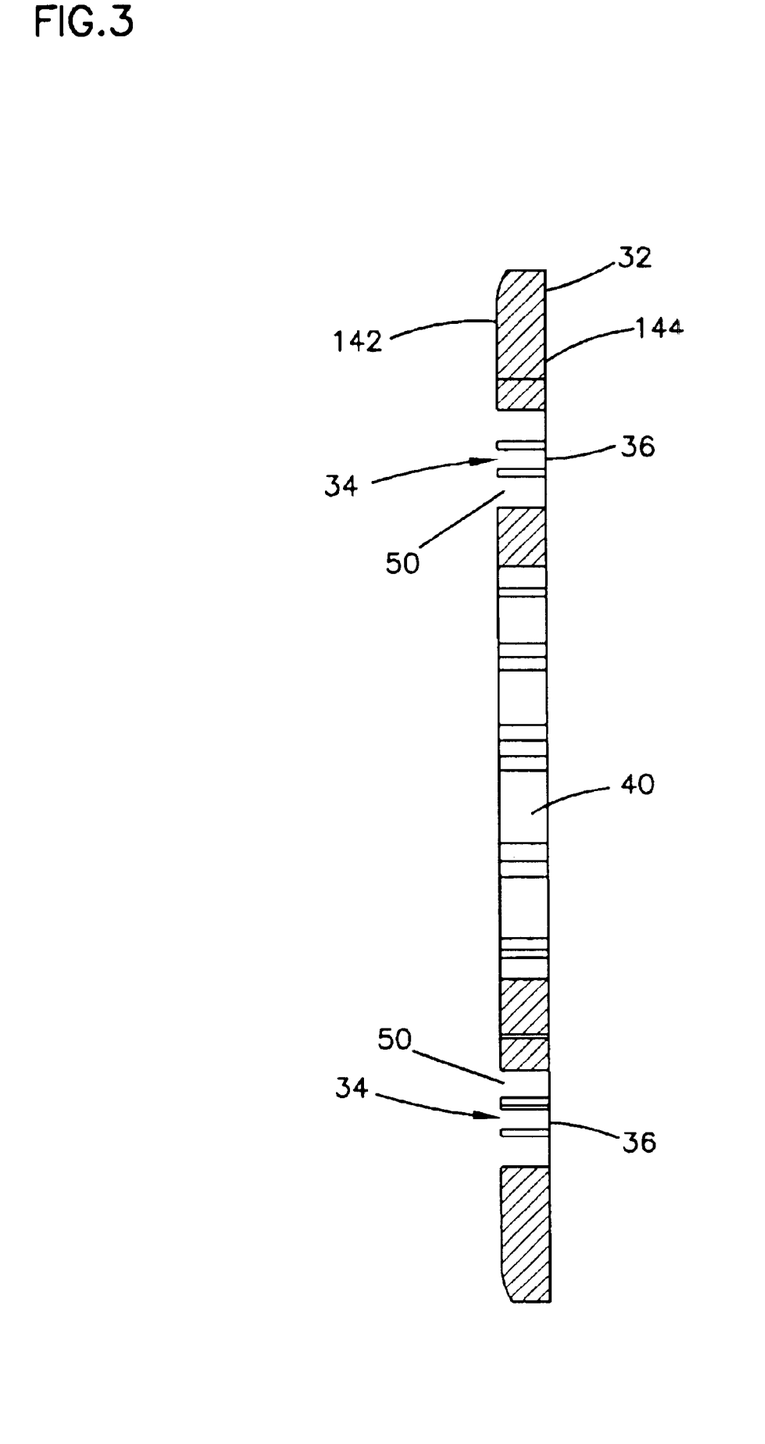
FIG. 3 is a cross-sectional view taken along section line 3—3 of FIG. 1.

FIGS. 1, 2A and 2B show an embodiment of a fixture 30 constructed in accordance with the principles of the present invention. The fixture 30 includes a holding plate 32 defining a central opening 40 and having a plurality of nests 34. An advantage of the fixture 30 is that it is an integral structure, cut from a single piece of material, and does not involve removable parts. Each nest 34 defines an opening 36 sized for receiving a ferrule of a fiber optic connector. The openings 36 extend completely through the plate 32 between upper and lower surfaces/sides 142 and 144 (shown in FIG. 3) of the holding plate 32. The nests 34 are circumferentially spaced about a reference axis 38 positioned at the center of the holding plate 32 (i.e., the nests 34 are arranged in a circular array).

Each nest 34 includes a moveable portion 42 moveable between a first, open position where the nest is sized to receive the ferrule (shown in FIG. 2B) and a second, closed position where the nest is sized to clamp the ferrule (shown in FIG. 2A). The moveable portion 42 is biased towards the second, closed position. The moveable portion 42 can be in the form of a flexible, cantilevered portion moveable between a rest position in which the nest is clamped, and a flexed position in which the nest is open.

The nests 34 are opened by applying a displacement force on the moveable portion 42 in the direction indicated by the arrows in FIG. 1. The displacement force can be provided by any actuating device. One embodiment of an actuator is described in detail below. In one embodiment, the moveable portions 42 have free end portions 54 that extend into the central opening 40 for receiving the displacement force. While FIGS. 1, 2A and 2B show twelve nests 34 in a fixture 30, the fixture 30 can contain a single nest 34 or any number of nests 34.

In the embodiment shown in FIGS. 1, 2A and 2B, the holding plate 32 includes a plurality of fixed portions 44 and a plurality of moveable portions 42 forming a plurality of nests 34. The fixed portions 44 oppose the moveable portions 42. In one embodiment, free end portions 54 of the moveable portions 42 extend beyond the fixed portions 44. First half-portions 60 of the nests 34 are formed by the fixed portions 44 and second half-portions 62 of the nests 34 are formed by the moveable portions 42 of the holding plate 32. Moveable portions 42 are formed by first and second slots 46, 48 cut from the central opening 40 and extending radially outwardly. The first slot 46 extends through the opening 36 of the nest 34. The second slot 48 is offset from the first slot 46 to form the cantilevered moveable portion 42. The cantilevered moveable portion 42 joins the fixed portion 44 at a flexing point 45. The moveable portions 42 are moveable relative to the fixed portions 44. For example, each of the moveable portions 42 is moveable between an at rest position (shown in FIG. 2A) and a circumferentially displaced, or flexed, position (shown in FIG. 2B).

When the nests 34 are in the at rest, or clamped position, the first and second half-portions (60, 62) of the nest 34 are sufficiently close together to clamp a ferrule. When a displacement force moves the moveable portion 42 away from the fixed portion 44, the second slot 48 narrows and the first slot 46 widens, thus opening the nest 34.

The moveable portions 42 are biased toward the at rest positions of FIG. 2A by inherent spring-like characteristics (i.e., elasticity or resiliency) of the material forming the moveable portions 42. In one embodiment, the fixture 30 including the moveable portions 42 are made of stainless steel. Preferably, the moveable portions 42 are displaced circumferentially in a flexing motion. When the displacement force is removed, internal spring-like characteristics bias the moveable portions 42 toward the at rest positions.

By way of non-limiting example, the holding plate 32 can be made of heat treated steel. Also by way of non-limiting example, the plate 32 can have a thickness of about 0.21 inches, a height of about 4.725 inches and a width of 4.725 inches; the first and second slots 46, 48 can have thicknesses of about 0.0025 inches and 0.014 inches, respectively; and the nest openings 36 can have an open position diameter of about 0.099 inches.

To enhance gripping when the nests 34 are in the clamped positions, the nests 34 can each include one or more bumps, projections, or irregularities (not shown) that extend radially into the openings 36. Also, to accommodate various connector configurations, depressions 50 are provided about the nests 34 in the upper side 142 of the holding plate 32. The depressions 50 are sized to receive portions of certain styles of connector housings (e.g., SC type connectors).

II. Actuator

Figure 4:
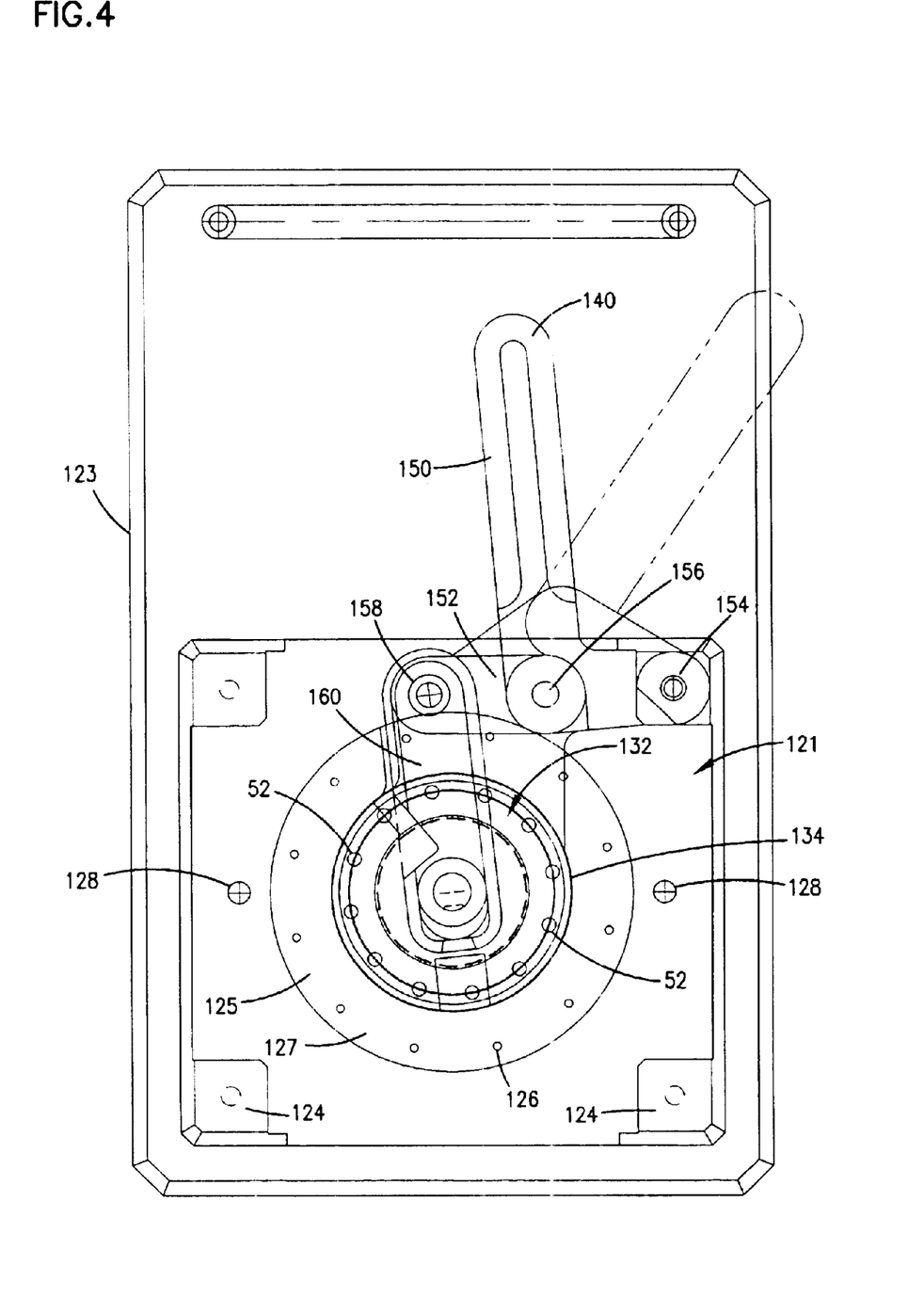
FIG. 4 is a top plan view of an embodiment of an actuating device constructed in accordance with the principles of the present invention.

FIG. 4 shows one embodiment of an actuator device 123 constructed in accordance with the principles of the present invention. The actuator device 123 has an integral set plate 121. The set plate 121 includes seating surfaces 124, an inset ring 125 with at least one alignment surface 127, and a circular array of openings 126. The inset ring 125 can be a separate piece, or it can be a region of the set plate 121. The set plate 121 also includes a plurality of fixture pins 128 that align with corresponding alignment apertures 56 in the holding plate 32.

Figure 5:
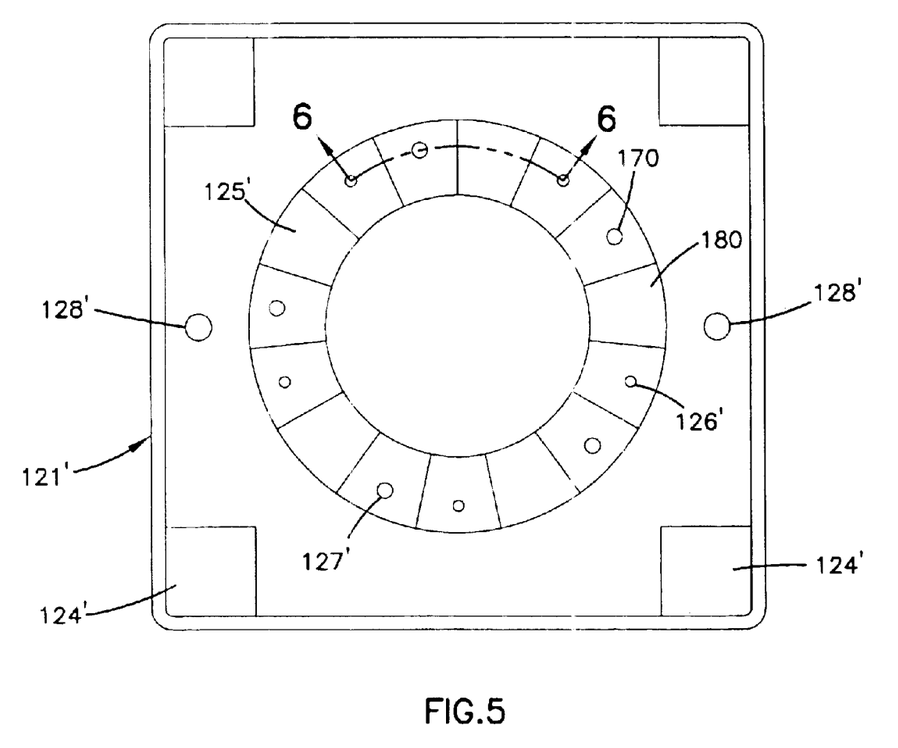
FIG. 5 is a top plan view of an alternative set plate.
Figure 6:
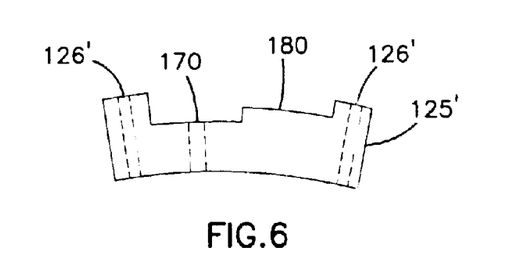
FIG. 6 is a cross-sectional view taken along section line 6—6 of FIG. 5.

FIGS. 5 and 6 show an alternative embodiment of a set plate 121' with the alignment surface 127' of the inset ring 125' divided into regions of differing elevations to provide a variety of offset distances from the seating surfaces 124' to accommodate various protrusion requirements for different ferrule sizes. Regions 180 of the alignment surface 127' without openings 126' accommodate ferrules without fibers.

The openings 126, 126' are positioned to align with the nests 34 of the holding plate 32 when the fixture 30 is mounted over the set plate 121, 121'. The openings 126, 126' are preferably smaller that the end faces of the ferrules desired to be polished, but larger than the fibers positioned within the ferrules. The openings 126 can all be the same size as shown in FIG. 4, or a plurality of different size openings 126', 170 can be present on a single inset ring 125', as shown in FIG. 5. The larger openings can be used for larger ferrules to receive the larger amount of epoxy residue that sometimes surrounds the fiber at the end faces of such ferrules. A set plate 121' with an inset ring 125' containing both different elevation regions and different sizes of openings 126', 170 reduces the number of set plates required to provide different ferrule offset lengths as may be required by different polishing processes. Typically, only surfaces of the same elevation are used to set the elevation of a given batch of ferrules.

The actuator device 123 includes a disk-shaped rotatable drive 132 that projects upward through a central opening 134 defined by the set plate 121. The rotatable drive 132 includes a plurality of posts 52 around the outer circumference. When a fixture 30 is placed on the set plate 121, as shown in FIG. 2A, the posts 52 are positioned between free end portions 54 of moveable portions 42 of nests 34.

A lever arm 140 including an L-shaped handle 150 is mechanically coupled to the rotatable drive 132. By pivoting the lever arm 140 outward and inward, the rotatable drive 132 with posts 52 is rotated in clockwise and counterclockwise directions, respectively. In one embodiment, the posts 52 are rotated about 5–15 degrees in each direction.

As show in FIG. 4, the lever arm 140 is coupled to the rotatable drive 132 by a linkage. The lever arm 140 is linked to the frame of the actuator device 123 at a first pivot point 154, and to an intermediate link 152 at a second pivot point 156. The intermediate link 152 is linked to a drive link 160 at a third pivot point 158. The drive link 160 is fixedly connected to the rotatable drive 132.

When the lever arm 140 is pivoted outward, as shown in dotted lines in FIG. 4, the rotation drive 132 and posts 52 are positioned away from the moveable portions 42 of a fixture 30 present on the actuator device 123. Pivoting the lever arm 140 inwards, as shown in solid lines in FIG. 4, rotates the rotatable drive 132 counterclockwise, forcing the posts 52 against the moveable portions 42, which opens the nests 34.

III. Methods of Use

In use, the fixture 30 is positioned over the set plate 121 of the actuator device 123 with the lever arm 140 pivoted outward. The fixture pins 128 of the set plate 121 are aligned with the alignment apertures 56 of the fixture 30. The nests 34 are in the biased clamped position as shown in FIG. 2A. The lever arm 140 is pivoted inward causing the rotatable drive 132 to rotate. As the rotatable drive 132 rotates, torque from the rotatable drive 132 is transferred to the moveable portions 42 of the fixture 30 through the posts 52. The torque from the rotatable drive 132 causes the moveable portions 42 to move, or flex, from the biased closed position of FIG. 2A to the open position of FIG. 2B. This movement of the moveable portions 42 causes the nests to move to the open positions. The fixture pins 128 prevent the holding plate 32 from rotating along with the moveable portion 42.

Ferrules of fiber optic connectors are individually inserted downwardly from the upper side 142 of the holding plate 32 into the openings 36 of the nests 34. The ferrules are pushed downwardly through the openings 36 until end faces of the ferrules protrude beyond the lower side 144 of the holding plate 32 and are seated upon the alignment surface 127 of the inset ring 125, and the optical fibers and epoxy residue extend into openings 126 in the inset ring 125. This ensures that all of the ferrule end faces are aligned along a common plane.

With all the ferrule end faces seated on the alignment surface 127 of the inset ring 125, the lever arm 140 is pivoted outward causing the posts 52 to move away from the moveable portions 42. This allows the moveable portions 42 return to the rest, biased closed, position of FIG. 2A such that the ferrules are firmly clamped within the nests 34 to inhibit relative movement thereinbetween.

With the ferrules clamped in the fixture 30, the fixture 30 is removed from the set plate 121 and transferred to a polishing wheel (not shown) where the end faces of the ferrules are polished. The one-piece fixture 30 provides the advantage of having the nests 34 in the clamped position without requiring any external force or added locking mechanisms. With no additional moving parts or locking mechanisms, the one-piece fixture is easy to manipulate and clean.

After polishing, the fixture 30 is once again placed on the set plate 121, the lever arm 140 is pivoted inward causing the posts 52 to move the moveable portions 42 to the open, flexed position of FIG. 2B, opening the nests 34 so the polished ferrules can be removed from the fixture 30. Thereafter, the process can be repeated on a subsequent batch of fiber optic connectors.

IV. Alternative Actuator

Figure 7:
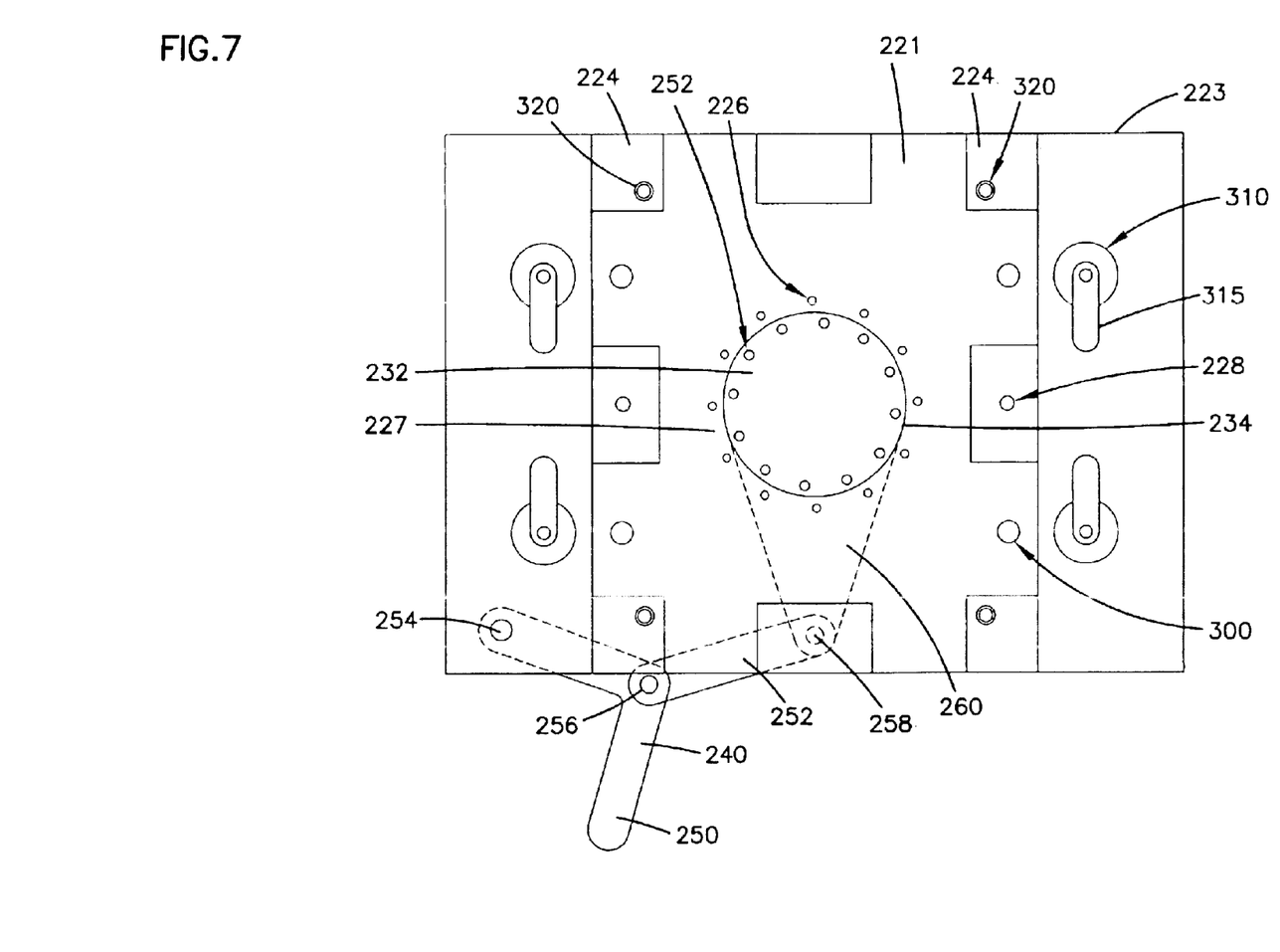
FIG. 7 is a top plan view of an alternative embodiment of an actuating device.

FIG. 7 shows an alternative embodiment of actuator device 223. This embodiment includes features for insuring uniform protrusion of ferrules from a polishing fixture. The actuator device 223 includes a set plate 221, swing clamps 310, a rotatable drive 232 and a lever arm 240. The set plate 221 has seating surfaces 224 and an alignment surface 227. A plurality of spring plungers 320 are embedded in the seating surfaces 224. The set plate also includes a plurality of fixture pins 228 that match alignment apertures 56 in a fixture 30 to prevent rotation of the fixture 30 during the clamping and setting process.

The spring plungers 320 are moveable between a first, at rest, position in which they extend above the seating surfaces 224, and a second, retracted, position in which they are substantially flush with the seating surfaces 224. Swing clamps 310 extend above the seating surfaces 224 and include clamp arms 315. The clamp arms 315 are rotatable toward the set plate 221 to clamp a fixture 30 placed onto the set plate 221. The clamp arms 315 are also moveable in a downward direction, toward the seating surfaces 224. The clamp arms 315 may be activated in any manner, such as pneumatically.

The alignment surface 227 has a plurality of openings 226 positioned to align with nests 34 of a holding plate 32 when the fixture 30 is mounted over the set plate 221. The actuator device 223 includes a disk-shaped rotatable drive 232 that projects upward through a central opening 234 defined by the set plate 221. The rotatable drive 232 includes a plurality of posts 252 around the outer circumference.

A lever arm 240 including an L-shaped handle 250 is mechanically coupled to the rotatable drive 232. By pivoting the lever arm 240 outward and inward, the rotatable drive 232 with posts 252 is rotated in clockwise and counterclockwise directions, respectively. The lever arm 240 is coupled to the rotatable drive 232 by a linkage. The lever arm 240 is linked to the frame of the actuator device 223 at a first pivot point 254, and to an intermediate link 252 at a second pivot point 256. The intermediate link 252 is linked to a drive link 260 at a third pivot point 258. The drive link 260 is fixedly connected to the rotatable drive 232.

In use, an empty fixture 30 is positioned on set plate 221 with fixture pins 228 aligned with the alignment apertures 56 of the fixture 30. The fixture 30 rests on spring plungers 320 above seating surfaces 224. The lever arm 240 is pivoted to rotate the rotatable drive 232 and posts 252, causing the nests 34 to move to the open positions. Ferrules of fiber optic connectors are individually inserted into the openings 36 of the nests 34. The ferrules are pushed downwardly through the openings 36 until end faces of the ferrules are seated upon the alignment surface 227 and the optical fibers extend into openings 226 in the set plate 221. With all the ferrule end faces seated on the alignment surface 227, the lever arm 240 is pivoted outward, causing the nests 34 to close.

Once the ferrules are clamped in the nests 34, the swing clamps are activated. The clamp arms 315 rotate over and above the fixture 30, and then descend toward the seating surfaces 224. As the clamp arms 315 exert a downward force, the spring plungers 320 retract and the fixture 30 is made to contact the seating surfaces 224. The combined force of the swing clamps 310 must be sufficient to overcome the combined resistance of the spring plungers 320 and the clamped ferrules. The fixture is pre-staged by inserting and clamping the ferrules while the fixture 30 is above the seating surface 224 on the spring plungers 320. This assures that once the fixture is drawn snugly against the seating surface 224, any ferrules not fully inserted will still end up with identical protrusion dimensions as those fully inserted.

The fixture 30 is then removed from the set plate 221 and transferred to a polishing wheel (not shown) where the end faces of the ferrules are polished. After polishing, the fixture 30 is once again placed on the set plate 221, the lever arm 240 is pivoted inward, opening the nests 34 so the polished ferrules can be removed from the fixture 30. Thereafter, the process can be repeated on a subsequent batch of fiber optic connectors.

Having described preferred aspects and embodiments of the present invention, modifications and equivalents of the disclosed concepts may readily occur to one skilled in the art. For example, while the nests illustrated herein are configured to hold ferrules in a vertically upright orientation, it will be appreciated that the nests could also be oriented so as to each hold a ferrule at an oblique angle relative to a polishing surface. However, it is intended that such modifications and equivalents be included within the scope of the claims that are appended hereto.

What is claimed is:

1. A device for holding a fiber optic connector having a ferrule containing an optical fiber, the device comprising:
   a clamp including a nest defining an opening sized to hold a ferrule, the nest including a moveable portion moveable between a first position where the nest is sized to receive the ferrule and a second position where the nest is sized to clamp the ferrule, the moveable portion being biased toward the second position.

2. The device of claim 1, further comprising a plate, wherein the moveable portion of the clamp includes a cantilever located between slots defined within the plate.

3. The device of claim 2, wherein the plate includes a plurality of clamps each including a nest, the nests having moveable portions biased toward second positions where the nests are sized to clamp ferrules, the moveable portions including cantilevers located between slots defined by the plate.

4. The device of claim 3, wherein the plate defines a central opening, and the plurality of nests are positioned about a circumference of the central opening.

5. The device of claim 4, wherein free end portions of the cantilevers project into the central opening.

6. The device of claim 4, wherein the slots include first slots that extend radially outwardly from the central opening and through the openings of the nests, and second slots that extend radially outwardly from the central opening and are offset from the first slots.

7. The device of claim 1, wherein the clamp further includes a fixed portion that opposes the moveable portion.

8. The device of claim 1, wherein the moveable portion projects beyond the fixed portion and is adapted for receiving a displacement force for moving the moveable portion between the first and second positions.

9. A device for holding a fiber optic connector having a ferrule containing an optical fiber, the device comprising:

a clamp including a nest sized to hold a ferrule, the nest including a flexible cantilever portion moveable between a first, flexed, position where the nest is sized to receive the ferrule and a second, at rest position where the nest is sized to clamp the ferrule.

10. The device of claim 9, wherein the device includes a plurality of the clamps.

11. The device of claim 10, wherein the nests of the clamps are arranged in a circular array.

12. A device for holding fiber optic connectors having ferrules containing optical fibers, the device comprising:

a plate including a plurality of nests, each nest defining a nest opening for receiving one of the ferrules, each nest including a cantilever positioned on one side of the nest opening and a fixed portion positioned on an opposite side of the nest opening;

each cantilever being located between a first plate slot that extends though the corresponding nest opening and a second plate slot offset from the first plate slot; and the cantilevers being flexibly moveable between first, flexed, positions where the nests are sized to receive the ferrules and a second, at rest position where the nests are sized to clamp the ferrules.

* * * * *